Jan. 11, 1949.  C. W. MORRIS  2,459,000
SPILL VALVE

Filed April 23, 1945  3 Sheets-Sheet 1

INVENTOR.
CHARLES W. MORRIS
BY
ATTORNEY

Jan. 11, 1949.　　　　C. W. MORRIS　　　　2,459,000
SPILL VALVE

Filed April 23, 1945　　　　　　　　　　3 Sheets-Sheet 2

INVENTOR.
CHARLES W. MORRIS
BY
ATTORNEY

Jan. 11, 1949.     C. W. MORRIS     2,459,000
SPILL VALVE
Filed April 23, 1945     3 Sheets-Sheet 3
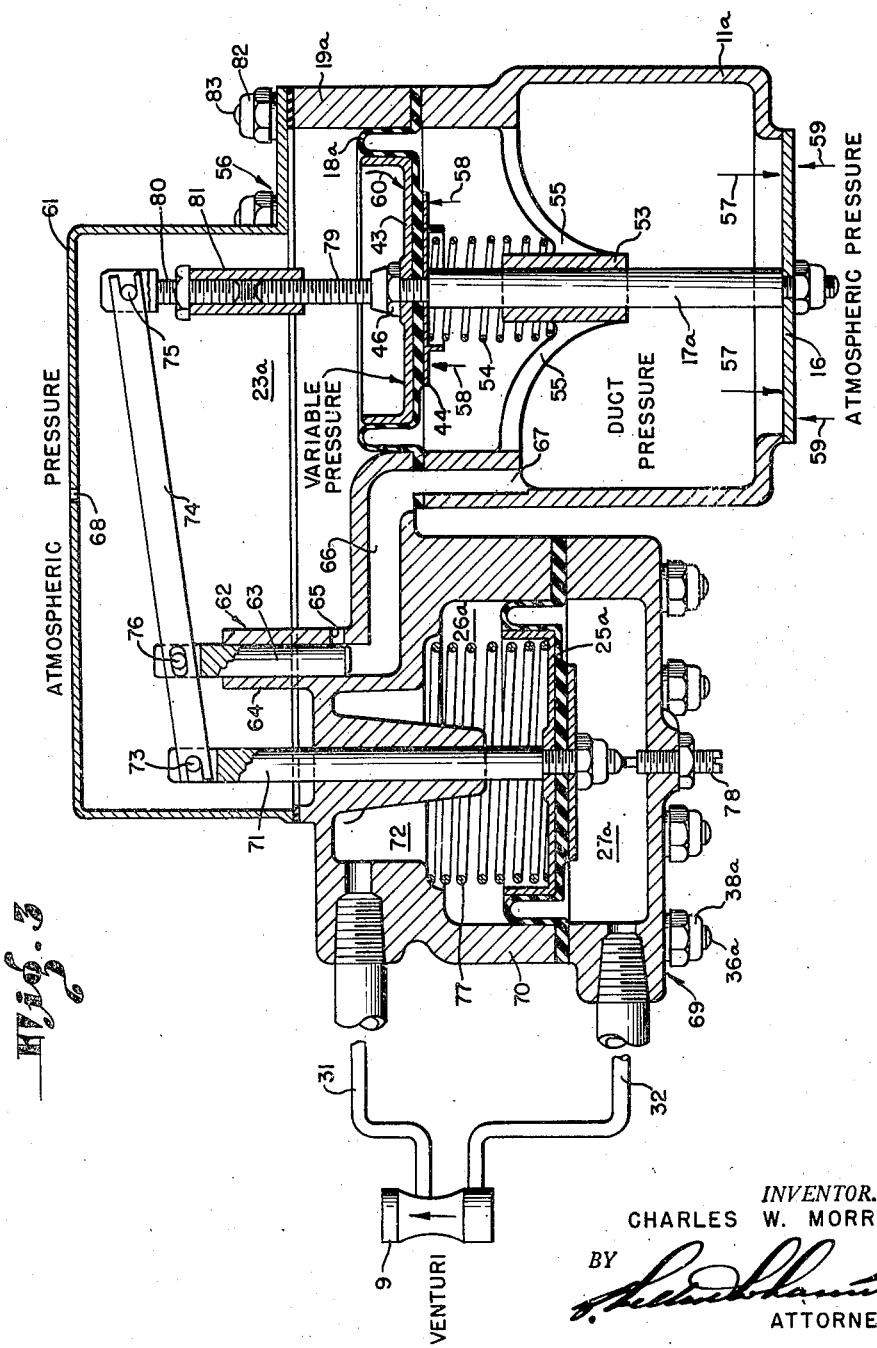
INVENTOR.
CHARLES W. MORRIS
BY
ATTORNEY Patented Jan. 11, 1949

2,459,000

UNITED STATES PATENT OFFICE 2,459,000

SPILL VALVE

Charles W. Morris, Los Angeles, Calif., assignor to The Garrett Corporation, Airesearch Manufacturing Company division, Los Angeles, Calif., a corporation of California Application April 23, 1945, Serial No. 589,871

15 Claims. (Cl. 98—1.5)

This invention relates to spill valves for regulating the mass rate of flow of gaseous fluids under pressure. The invention is applicable to any system where it is desirable to regulate the mass rate of flow of a gaseous fluid through a duct by releasing excess fluid from the duct, but is particularly useful in the ventilation, under pressure, of sealed enclosures such as, for example, the cabin of an aircraft, through a positive displacement compressor.

The characteristics of positive displacement superchargers for pressurizing the cabin of small fighter airplanes are such that at sea level the mass flow of air delivered to the cabin is high and at high altitudes the mass flow delivery is low. It is desirable to maintain a substantially constant mass rate of flow into the cabin within the range of the supercharger operation.

The compression of the air being delivered into the cabin adds heat to the air and where the atmosphere is already at a fairly high temperature level, the compressed air delivered into the cabin will raise the temperature of the air within the cabin to an uncomfortably high level. It may then become necessary to cool the air within the cabin or the air entering the cabin in order to keep the cabin temperature down within a proper range for comfort. Any excess of air under pressure delivered into the cabin will unnecessarily add to the load of the cooling apparatus. Any excess of air under pressure delivered into the cabin will also unnecessarily add to the load upon the cabin pressure regulating apparatus which is usually located in the cabin outlet for the venting of vitiated air from the cabin. The compressing of an excess amount of air will also place an unnecessary added load upon the supercharger and require an unnecessary excess of power for operating the same.

With the foregoing in mind, the invention has as one of its objects to provide an aircraft cabin pressurizing system adapted to maintain an approximately constant mass rate of flow of air into the cabin within the range of supercharger operation.

Another object is to provide a system for ventilating an aircraft cabin under pressure, including means for curtailing the inflow of air into the cabin when it tends to exceed a selected desirable maximum rate of mass flow.

A further object is to provide a cabin pressurizing system including a spill valve adapted, when the mass rate of flow delivered from the supercharger is higher than that required to meet the conditions under which the plane is operating, to relieve from the cabin inlet duct a portion of the pressurized airstream flowing therethrough, so as to prevent the cabin inflow from exceeding the rate required for proper pressurization and ventilation of the cabin.

A more general object of the invention is to provide a circulation system for gaseous fluids including a spill valve adapted to release excess fluid from the pressurized fluid stream in response to any increase of the mass rate of flow of said stream above a level adequate for proper operation of the system.

The invention further contemplates the provision of a system for circulating gaseous fluids under pressure including a spill valve for releasing excess fluid from the pressurized fluid stream and a control device located in a duct through which such pressurized stream flows and responsive to the mass rate of flow therethrough, for controlling the spill valve.

Another object of the invention is to provide a spill valve adapted to be located in a duct through which a stream of pressurized gaseous fluid is flowing and to eliminate excess fluid from said duct in response to any increase in the mass rate of the fluid through the duct above a preselected level.

A further object of the invention is to provide a spill valve adapted to be operated by the differential between relatively high pressure of a gaseous fluid within a duct through which the spill valve controls the flow and relatively low pressure externally of said duct, as a force for actuating the valve in such a manner as to release excess fluid from the duct when the mass rate of flow therethrough exceeds a preselected level. With specific reference to an airplane cabin pressurizing system, this object contemplates utilizing the differential between ambient atmospheric pressure and supercharger discharge pressure for operating a spill valve located between the supercharger outlet and the cabin inlet, for releasing excess air from the duct connecting the supercharger through the cabin inlet when the mass rate of supercharger discharge exceeds the requirement for cabin ventilation.

Another object of the invention is to provide a spill valve incorporating a valve actuating servo motor operated by the differential in fluid pressures within and without a duct through which a pressurized stream of gaseous fluid is being conveyed, in combination with a control device responsive to excess mass rate of flow through said duct, for controlling the servo motor.

Another object of the invention is to provide a spill valve having the characteristics defined in the preceding paragraph, and having, in combination therewith, a follow-up connection between the control device and the servo motor for modifying the action of the control device in accordance with the setting of the spill valve so as to eliminate hunting and stabilize the action of the valve.

A still further object of the invention is to provide a fluid circulating system incorporating a spill valve having the characteristics referred to above and including a flow responsive device in the form of a Venturi forming a part of the duct through which the pressurized fluid stream flows, together with means for transmitting variations of pressure differential between high and low pressure zones within said Venturi (in response to variations in the rate of mass flow therethrough) to the control device for actuating the same in a manner to cause the servomotor to open the spill valve when the mass rate of flow exceeds the level required for proper operation of the system.

Further objects and advantages of the invention will be brought out in the following part of the specification.

Referring to the drawings which are for illustrative purposes only,

Fig. 3 is a composite view including a sectional view through the spill valve of Fig. 2 and a schematic showing of the flow responsive control.

Figure 1:
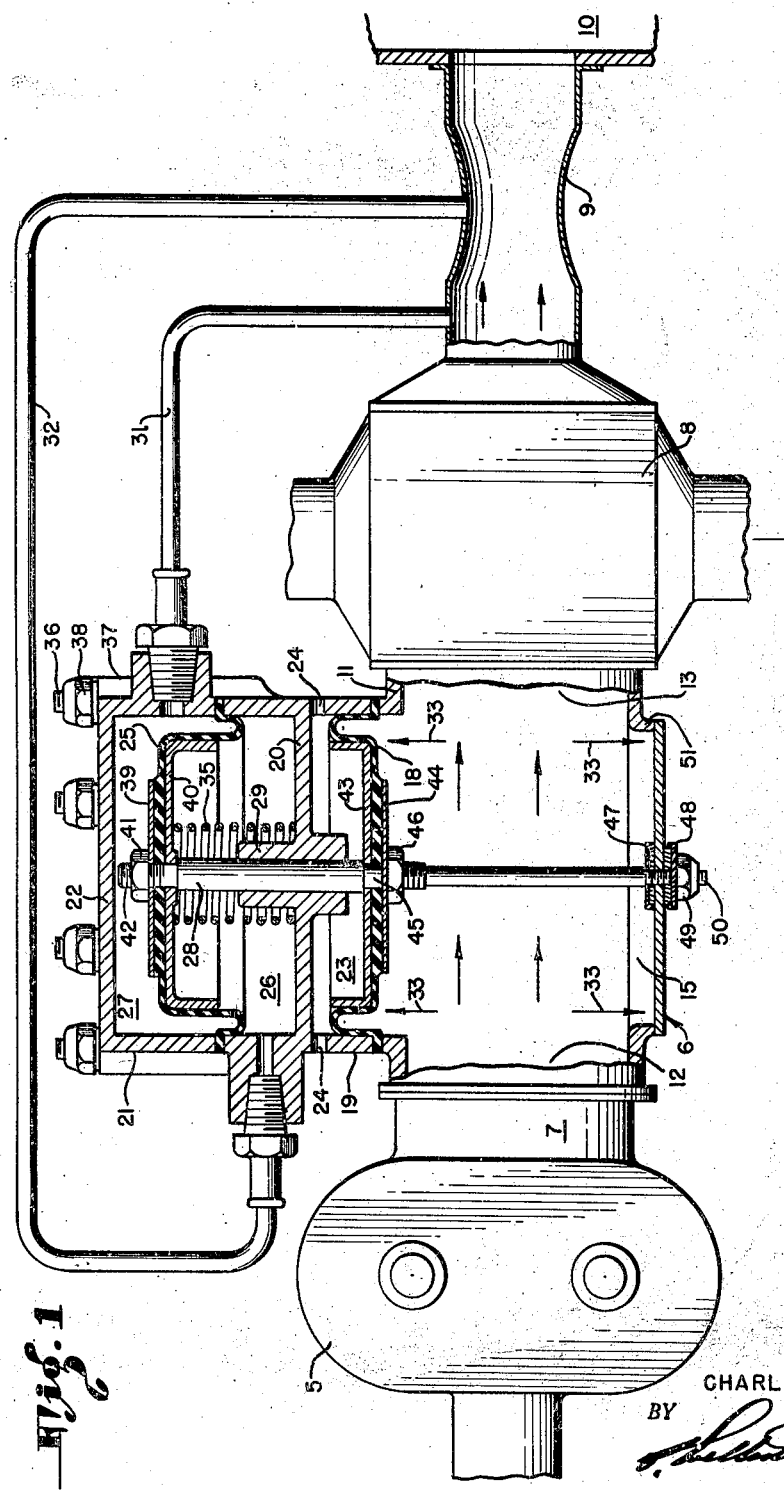
Fig. 1 is a view, partially in section, of a portion of a cabin pressurizing system embodying the invention.

As an example of one form in which the invention may be embodied, I have shown in Fig. 1 a portion of a cabin pressurizing system including a positive displacement supercharger 5, a spill valve 6, through which the discharge from the outlet 7 of the supercharger is passed to a cooler 8 for removing excess heat of compression, and a Venturi 9 through which the compressed air, after passing through the cooler 8, is delivered into the cabin enclosure 10.

The valve 6 includes a duct section 11 having an inlet 12 connected to the outlet 7 of the supercharger and an outlet 13 connected to the inlet of the cooler 8. The duct section 11, the cooler 8 and the Venturi 9 collectively form a duct for delivering compressed air into the cabin 10.

The duct portion 11 of the spill valve is provided with a spill vent 15 normally closed by a valve 16 and adapted, when the valve 16 opens, to release from the duct a portion of the compressed air passing therethrough. The valve 16 is carried upon a valve stem 17 which in turn is carried by a diaphragm 18 forming a wall of the duct section 11 opposite the valve element 16.

The spill valve 6 includes the duct section 11, an intermediate casing section 19 carrying a partition 20, and an end casing section 21 having an end wall 22. Defined between the diaphragm 18 and partition wall 20 is a chamber 23 which communicates with atmosphere through orifices 24. Between the casing section 19 and the end casing section 21 is defined a space which is subdivided by a valve operating diaphragm 25 into a relatively low pressure chamber 26 and a relatively high pressure chamber 27. The valve stem 17 has an enlarged portion 28 which is slidably mounted in a bearing boss 29 in the central region of the partition wall 20, and the upper end of the valve stem is mounted in the diaphragm 25. Venturi inlet pressure is communicated to the chamber 27 through a tube 31, one end of which communicates with the chamber 27 and the other end of which communicates with the inlet of the Venturi, and the relatively lower Venturi throat pressure is communicated to the chamber 26 by a tube 32, one end of which communicates with the chamber 26 and the other end of which communicates with the throat of the Venturi.

Relatively high duct pressure is maintained within the duct section 11 and is exerted equally against the substantially equally exposed areas of the valve element 16 and the assembly including the diaphragm 18, as indicated by the arrows 33. The opposite sides of the valve element 16 and the diaphragm 18 are exposed to atmospheric pressure, which is also substantially balanced against the two elements. The differential of Venturi inlet pressure, applied in the chamber 27, over Venturi throat pressure, applied in the chamber 26, exerts a force which tends to open the valve 16 but, when the airplane is operating under conditions which do not produce an excess flow of air through the duct (for example, when flying at the higher levels) this pressure differential is balanced by the pressure of a coil spring 35 under compression between the partition wall 20 and the assembly including the diaphragm 25.

In the operation of the system, when the Venturi pressure differential is overcome by the spring 35 as above described, the valve 16 will remain closed and all of the supercharger discharge will pass into the cabin 10. When an excess of compressed air is delivered by the supercharger, however (as when the plane is operating at the lower levels), the increased flow through the venturi will increase the Venturi pressure differential exerted against the diaphragm 25 in the chamber 27 to the point where the pressure of the spring 35 will be overcome and the valve stem 17 will be moved in the direction to open the valve 16. This will permit a portion of the air flowing through the duct to be released into the atmosphere, will consequently reduce the mass flow through the venturi, and will permit the valve 16 to be stabilized at a position in which just sufficient air is allowed to escape through the port 15 to release the excess air from the duct.

Referring now to constructional features, the casing section 19 is secured to the casing section 21 by studs 36 mounted in the casing section 19 and extending through bosses 37 formed on the casing section 21, and nuts 38 threaded on the ends of the studs 36. The peripheral portion of the diaphragm 25 is clamped between the casing sections 19 and 21. The central portion of the diaphragm 25 is clamped between the washer 39 and cup member 40 which in turn are clamped between a nut 41 threaded onto a reduced end portion 42 of the stem 17 and a shoulder defined between the reduced end portion 42 and the enlarged portion 28 of the stem 17. The diaphragm 18 has its peripheral portion clamped between the duct section 11 and the casing section 19 and has its central portion clamped between the washer 44 and cup member 43, which in turn are clamped between a shoulder defined between the enlarged portion 28 and an intermediately reduced portion 45 of the stem 17, and a nut 46 threaded onto the stem portion 45. The valve element 16 is clamped between washers 47 and 48 which in turn are clamped between a nut 49 threaded onto a reduced end portion 50 of the stem 17 and a shoulder defined between the reduced end portion 50 and the body portion of the stem 17. The valve element 16 cooperates with a valve seat comprising an annular lip 51 rimming the spill vent 15.

Figure 2:
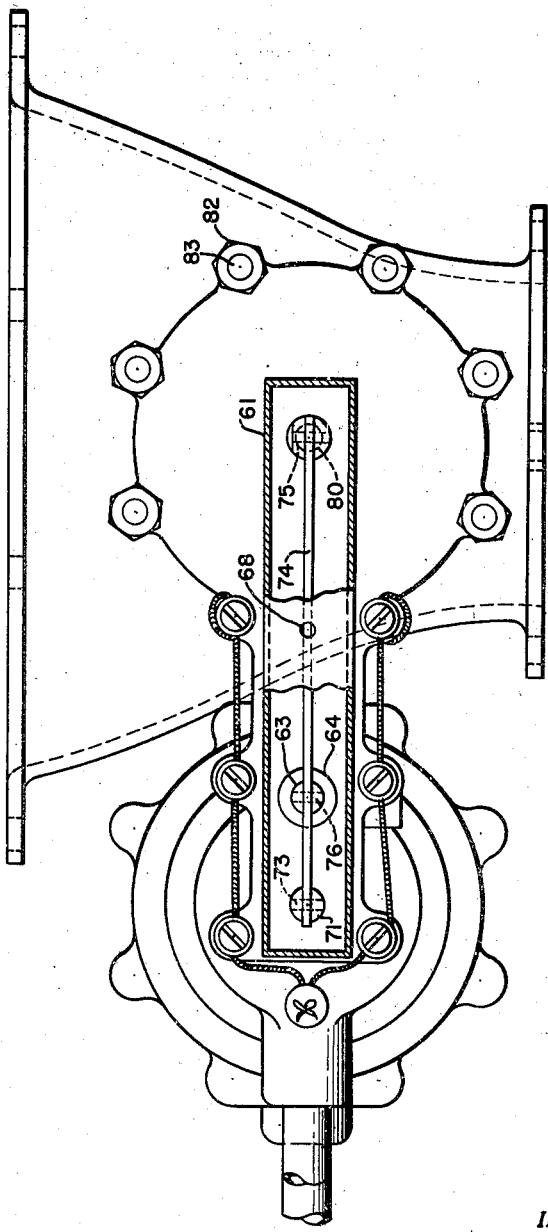
Fig. 2 is a plan view of a modified form of the spill valve.

In the preferred form of the invention shown in Figs. 2 and 3, the diaphragm 18a, in addition to the function of the diaphragm 18 of balancing pressures on the valve element 16 (when conditions do not require opening of the valve), acts as the pressure responsive element of a servomotor, indicated generally by the numeral 56, for operating the valve element 16 to and from open position in response to changes in flow conditions. The servomotor 56, instead of depending for its operation upon the Venturi pressure differential (as in the previously described form of the invention) has the advantage of the differential between duct pressure and atmospheric pressure or a pressure intermediate atmospheric and duct pressure.

The inner side of the valve element 16, and the inner side of the diaphragm 18a, opposed thereto, are subject to duct pressure as indicated by the arrows 57 and 58 respectively, the outer side of the valve element 16 is subject to atmospheric pressure as indicated by the arrows 59, and the other side of the diaphragm 18a is subject to a pressure, indicated by the arrows 60, exerted in a chamber 23a defined between the diaphragm 18a, a casing section 19a, and a casing cover 61. When the pressures against the valve element 16 and the diaphragm 18a are thus balanced, the valve 16 is held securely closed by a light coil spring 54 which is under compression between the diaphragm 18a and a spider 55 formed in the duct section 11a. The spider 55 carries a bearing 53 in which the stem 17a of the valve 16 is mounted. The pressure in the chamber 23a is controlled by a pilot valve 62 comprising a valve plunger 63 slidably mounted in a boss 64 in the casing section 19a, adapted, in a retracted position, to establish communication between the interior of the duct section 11a and the chamber 23a through a port 65 in a side of the boss 64, a passage 66 in the casing section 19a, and a communicating passage 67 in the wall of the duct section 11a, thus permitting air at duct pressure to pass from the duct into the chamber 23a and raise the pressure therein. In extended position of the valve plunger 63, it closes the port 65 and permits air to escape from the chamber 23a through a restricted orifice 68 in the wall of the casing cover 61, whereby the pressure in the chamber 23a may equalize with, or approach atmospheric pressure.

The pilot valve 62 is differentially operated by the main servomotor 56 and a pilot servomotor 69, the latter in turn being operated by pressure differential developed in the venturi 9. The pilot servomotor 69 includes a diaphragm 25a clamped between a portion 70 of the casing 19a and a casing section 22a and forming with these casing sections respectively differential pressure chambers 26a and 27a. Attached to the center of the diaphragm 25a is a stem 71 which is slidably extended through a bearing 72 in the casing portion 70, and has an end portion extending into the chamber 23a and pivoted at 73 to one end of a lever 74. The other end of the lever 74 is pivoted at 75 to an extension of the main valve stem 17a and an intermediate portion of the lever 74 is pivoted at 76 to the valve plunger 63.

Venturi throat pressure is communicated to the chamber 26a through a tube 31 and Venturi inlet pressure is communicated to the chamber 27a through the tube 32. The normal differential of the higher pressure in the chamber 27a over the lower pressure in the chamber 26a is balanced by a spring 77 under compression between the diaphragm 25a and the casing portion 70.

In the operation of the spill valve shown in Figs. 2 and 3, when the flow through the venturi is not excessive, the pressure differential in the chamber 27a will be sufficiently low to permit the spring 77 to maintain the diaphragm 25a in a fully retracted position, which may be determined by engagement of the end of the stem 71 against an adjustable stop pin 78 threaded into the casing section 22a. This condition will prevail when a plane equipped with the invention is flying at high altitude where the air is thin and the output of the supercharger is reduced. When the plane is flying at low altitude, in relatively dense air, however, excessive air flow through the venturi caused by increased supercharger output will increase the Venturi pressure differential to a point where the effective pressure against the diaphragm 25a in the chamber 27a will overcome the resistance of the spring 77 and move the diaphragm and stem 71 so as to retract the valve plunger 63, open the port 65, and permit air at duct pressure to enter the chamber 23a, causing the pressure therein to approach duct pressure. When a sufficient increase in pressure has occurred in the chamber 23a, the delayed resistance of the spring 54 will be overcome by the differential between this higher pressure and atmospheric pressure acting against the outer side of the valve element 16, causing the valve to open.

The opening movement of the valve 16 will be transmitted to the lever 74 by the stem 17a in the direction to move the plunger 63 toward closed position, thus restricting or shutting off the further passage of air at duct pressure into the chamber 23a and permitting the pressure in the chamber 23a to recede toward atmospheric pressure. This follow-up action anticipates the drop in airflow which will occur as a result of the opening of the valve 16, and prevent that drop from going beyond the reduction required for balancing the airflow at the desired value. Thus, hunting is avoided and the valve will operate smoothly, without rapid fluctuations, in accordance with requirements. Adjustment of the differential relation between the operation of the two servomotors upon the valve plunger 63 may be effected by the provision of an adjustable connection between the threaded reduced end 79 of the stem 17a and a stud 80 which carries the pivot 75. Such adjustable connection may be in the form of a sleeve 81 into which the threaded end 79 and stud 80 are threaded.

The casing cover 61 is secured to the casing section 19a by nuts 82 threaded onto studs 83 mounted in the casing section 19a. The duct section 11a may be secured in a similar manner to the casting section 19a, and is secured thereto with the diaphragm 18a clamped between the two sections. Likewise, the casing section 22a is secured to the casing portion 70, with the peripheral portion of the diaphragm 25a clamped therebetween, by means of nuts 38a threaded onto studs 36a mounted in the casing portion 70. The cup member 43 and the washer 44 which secure the central portion of the diaphragm 18a are clamped between a shoulder on the stem 17a defined between the main body portion thereof and the reduced portion 79 thereof, and a nut 46 threaded onto the latter. Other detailed parts referred

I claim as my invention:

1. In an aircraft cabin pressurizing system, in combination with a cabin to be pressurized and from which controlled escape of the air is permitted, means for directing a stream of air under pressure into said cabin, said last means including a spill valve having a duct portion and a venturi, said duct portion and venturi being arranged in series in the order named between said source of pressure and said cabin, said spill valve further including a fluid release port and a valve element for closing said port, said valve element opening outwardly, a servomotor including a diaphragm and means forming on the respective sides of said diaphragm a pair of fluid pressure chambers, a second diaphragm forming one side of said duct, the pressure within said duct being balanced against the inner sides of said second mentioned diaphragm and said valve element respectively and the outer sides of said second mentioned diaphragm and valve element being exposed to ambient pressure; a stem connecting said valve element and said two diaphragms, a spring yieldingly urging said valve stem in the direction to close said valve, and connections between said venturi and said servomotor adapted to establish in said chambers as a result of pressure drop in said venturi differential pressure adapted to overcome said spring and cause said valve to open when the rate of mass flow through said venturi exceeds a predetermined maximum.

2. In an aircraft cabin pressurizing system, the combination of: a spill valve including a duct portion and a venturi arranged in series with said duct portion in an inlet passage for air from a source of pressure into a cabin enclosure from which controlled escape of air is permitted, said spill valve including an air release port and an outwardly opening valve element cooperating externally with said port and adapted when closed to form one side of said duct portion, and a pressure responsive element having an area substantially the same as the exposed area of said valve element, forming another side of said duct portion, means connecting said elements whereby the pressure within said duct is balanced between said elements; a fluid responsive servomotor for controlling the opening and closing of said valve; and connections between the throat and inlet respectively of said venturi and said servomotor adapted to provide in said servomotor a differential of pressure which, when the mass rate of flow through said venturi exceeds a predetermined maximum, will operate said servomotor to cause opening of the valve.

3. In an aircraft cabin pressurizing system, means for delivering air under pressure from a pressure source into a cabin enclosure from which controlled escape of air is permitted; a spill valve including a duct portion forming a part of said air delivery means and a venturi also forming a part of said air delivery means, said spill valve having an air release port and a valve element adapted to cooperate externally with said port for forming one side of said duct portion, a pressure responsive element forming another side of said duct portion; means forming with the other side of said pressure responsive element a chamber having an orifice through which the pressure in said chamber may equalize with ambient pressure; means yieldingly urging said valve element toward closed position and adapted to hold it closed when the pressure in said chamber is thus equalized with atmospheric pressure; and means controlled from said venturi for permitting a flow of fluid under pressure from said duct portion into said chamber for raising the pressure therein above atmospheric pressure and to a level which, when the mass rate of flow of air through said venturi exceeds a predetermined maximum, will overcome the resistance of said yielding means and cause said valve to open.

4. A spill valve including a duct portion adapted to form a part of a duct for conveying fluid under pressure into an enclosure to be pressurized, said duct portion having a fluid release port, a valve element cooperating externally with said port and opening outwardly to release fluid from said duct portion; a pressure responsive element forming a side of said duct portion; means connecting said elements for movement in unison; means forming with the other side of said pressure responsive element a chamber having a restricted orifice through which pressure in said chamber may equalize with ambient pressure; means including a pilot valve for controllably permitting a flow of fluid from said duct portion into said chamber for raising the pressure therein above ambient pressure and causing said spill valve to open; and means responsive to changes in the mass rate of flow through said duct for controlling the pilot valve.

5. A spill valve including a duct portion adapted to form a part of a duct for conveying air under pressure from a pressure source into an aircraft cabin to be pressurized; an outwardly opening valve element forming one side of said duct portion; a diaphragm forming an opposite side of said duct portion and having substantially the same exposed area as said valve element; means connecting said diaphragm and said valve element whereby the pressure within the duct may be balanced between said diaphragm and valve element; means forming on the other side of said diaphragm a chamber having a restricted orifice permitting the pressure in said chamber to equalize with atmospheric pressure, balancing the atmospheric pressure against the outer side of said valve element; means yieldingly operative to close said valve element when the pressure in said chamber is thus balanced; means including a pilot valve for permitting air under pressure to flow from said duct portion into said chamber so as to raise the pressure therein sufficiently to overcome said yielding means and open said valve; and means responsive to flow through said duct in excess of a predetermined mass rate of flow to open said pilot valve and thereby effect the opening of said spill valve.

6. A spill valve comprising: a duct portion adapted to form a part of a duct for conveying fluid under pressure and having a port for release of excess fluid from said duct; a valve element cooperable externally with said port for closing the same and forming one side of said duct; a pressure responsive element forming an opposite side of said duct; means tying said valve element to said pressure responsive element so that the pressure within said duct portion may be substantially balanced between said elements; means cooperating with the other side of said pressure responsive element to define a chamber having a restricted orifice through which the pressure therein may equalize with the pressure exerted against the outer side of said valve element; means yieldingly operative to hold said valve element closed when the pressure in said chamber is thus equalized; means including a pilot valve for permitting a flow of fluid under pressure from said duct portion into said chamber to raise the pressure therein sufficiently to overcome said yielding means and cause the valve to open; and means responsive to an excess rate of mass flow of fluid in said duct above a predetermined maximum to open said pilot valve and permit said raising of pressure in said chamber.

7. In a spill valve, as defined in claim 6, a venturi forming a portion of said duct, and a servomotor responsive to a differential of pressure developed in said venturi as a result of excess mass flow therethrough, comprising the means for operating said pilot valve.

8. A spill valve as defined in claim 6, wherein said pilot valve opening means comprises a servomotor responsive to a pressure differential created by excess mass rate of flow through said duct, and a differential connection between said servomotor, said spill valve element and said pilot valve, such that the opening movement of said spill valve element results in a closing movement of said pilot valve and vice versa.

9. In a spill valve, a duct portion forming a part of a duct for conveying fluid under pressure and having a fluid release port therein; a valve element cooperating externally with said port and openable outwardly to release excess fluid from the duct; a diaphragm forming a side of said duct portion opposite said valve element; a valve stem connecting said valve element to said diaphragm whereby the pressure within the duct may be substantially balanced against the inner sides of said valve element and diaphragm; means forming with the other side of said diaphragm a chamber having a restricted orifice permitting the pressure therein to equalize with the pressure externally of said valve element; means including a pilot valve for permitting a flow of fluid under pressure from said duct portion into said chamber for raising the pressure therein so as to cause said valve element to open; a control servomotor including a diaphragm and means forming differential pressure chambers on opposite sides thereof; a stem attached to said control servomotor diaphragm and extending into said first mentioned chamber; and a differential connection between said spill valve stem and said control servomotor stem and said pilot valve for producing a follow-up action whereby opening of said spill valve to release excess pressure from said duct will result in moving said pilot valve toward closed position to prevent over-release, said differential connection comprising a rocking lever riveted at its ends to said spill valve stem and said control servomotor stem and said pilot valve being arranged intermediate said stems and pivoted to an intermediate region of said lever.

10. Means for maintaining a substantially uniform mass rate of flow of air from a source of pressure into an aircraft cabin, comprising, in combination with a spill valve as defined in claim 12, with the duct portion of said spill valve forming a part of a duct for conveying air under pressure into the cabin, a venturi also forming a part of said duct, and connections between said venturi and said control servomotor whereby excess pressure drop through said venturi caused by excess flow in said duct will operate said control servomotor to open said pilot valve.

11. Means for regulating the flow of fluid into a chamber comprising: a spill valve in a supply duct for fluid from a source of pressure into said chamber, said spill valve being subjected on opposite sides to pressure externally and internally respectively of said duct; means, including a movable member connected to the spill valve and subjected on opposite sides to pressure externally and internally respectively of said duct and so constructed and arranged that the spill valve is balanced by fluid pressure externally of the duct and fluid pressure internally thereof; yielding means urging the valve in the closing direction; differential pressure responsive means for controlling the opening of said valve; and means responsive to the mass rate of fluid flow through the duct for controlling the differential pressure responsive means.

12. In an aircraft cabin pressurizing system, the combination of: a spill valve including a duct portion and a venturi arranged in series with said duct portion in an inlet passage for air from a source of pressure into a cabin enclosure from which controlled escape of air is permitted, said spill valve including an air release port and an outwardly opening valve element cooperating externally with said port and adapted when closed to form one side of said duct portion; means, including a movable wall connected to the spill valve and subjected on opposite sides to fluid pressure externally and internally respectively of the duct and so constructed and arranged with respect to the spill valve that said valve is respectively balanced by fluid forces externally of the duct and fluid forces internally thereof; yielding means urging the valve in the closing direction; differential pressure responsive means for controlling the opening of said valve; and means connecting the venturi with said differential pressure responsive means whereby an operative differential of pressure is established in said differential pressure responsive means when the mass rate air flow through the venturi exceeds a predetermined maximum.

13. Means for regulating the flow of fluid into a chamber comprising: a spill valve in a supply duct for fluid from a source of pressure into said chamber; means operably associated with the spill valve and so constructed and arranged that ambient pressure is effective to urge said valve in opening and closing directions with balanced force and duct pressure also is effective to urge said valve in opening and closing directions with balanced force; yielding means urging the valve in the closing direction; differential pressure responsive means for controlling the opening of said valve; and means responsive to the mass rate of fluid flow through the duct for controlling the differential pressure responsive means.

14. A spill valve including a duct portion adapted to form a part of a duct for conveying fluid under pressure into an enclosure to be pressurized, said duct portion having a fluid release port; a valve element cooperating externally with said port and opening outwardly to release fluid from said duct portion; means operably associated with the spill valve and so constructed and arranged that ambient pressure is effective to urge said valve in opening and closing directions with balanced force and duct pressure also is effective to urge said valve in opening and closing directions with balanced force; means, including a pilot valve, for controllably permitting fluid from the duct portion to unbalance the forces of the ambient pressure for effecting opening of the spill valve; and means responsive to changes in the mass rate of flow through the duct for controlling the pilot valve.

15. Means for regulating the flow of fluid into a chamber, comprising: a spill valve member biased in the closing direction and located in a supply duct for fluid from a source of pressure into said chamber; a member connected to said spill valve member, said members being so constructed and arranged that the spill valve is balanced with respect to fluid pressure externally of the duct and fluid pressure internally thereof; differential pressure responsive means for controlling the opening of said valve; and means responsive to the mass rate of fluid flow through the duct for controlling the differential pressure responsive means.

CHARLES W. MORRIS.

REFERENCES CITED

The following references are of record in the file of this patent:

UNITED STATES PATENTS

| Number | Name | Date |
| --- | --- | --- |
| 2,276,371 | Cooper et al. | Mar. 17, 1942 |
| 2,316,416 | Gregg | Apr. 13, 1943 |
| 2,385,664 | Warner | Sept. 25, 1945 |
| 2,393,343 | Schroeder | Jan. 22, 1946 |
| 2,399,326 | Crot | Apr. 30, 1946 |
| 2,405,670 | Price | Aug. 13, 1946 |

Certificate of Correction

Patent No. 2,459,000.

January 11, 1949.

CHARLES W. MORRIS

It is hereby certified that error appears in the printed specification of the above numbered patent requiring correction as follows:

Column 9, line 64, for the claim reference numeral "12" read *9*; and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*